(12) United States Patent
Vaardal et al.

(10) Patent No.: US 11,086,776 B2
(45) Date of Patent: Aug. 10, 2021

(54) MAINTAINING CORRECTNESS OF POINTERS FROM A MANAGED HEAP TO OFF-HEAP MEMORY

(71) Applicant: International Business Machines Corporation, Armonk, NY (US)

(72) Inventors: Bjoern Vaardal, Kars (CA); Daniel Heidinga, Ottawa (CA); Graham Chapman, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 16/115,642

(22) Filed: Aug. 29, 2018

(65) Prior Publication Data

US 2020/0073797 A1    Mar. 5, 2020

(51) Int. Cl.
| | |
|---|---|
| *G06F 3/06* | (2006.01) |
| *G06F 12/02* | (2006.01) |
| *G06F 12/0817* | (2016.01) |
| *G06F 12/0802* | (2016.01) |

(52) U.S. Cl.
CPC ...... *G06F 12/0253* (2013.01); *G06F 12/0802* (2013.01); *G06F 12/0826* (2013.01); *G06F 3/067* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 7,197,619 B2 * | 3/2007 | Redestig | G06F 12/0253 |
| | | | 711/170 |
| 7,509,338 B1 | 3/2009 | Tarditi | |
| 8,181,177 B1 | 5/2012 | Pliss et al. | |
| 8,281,014 B2 * | 10/2012 | Stanev | H04L 67/142 |
| | | | 709/227 |
| 9,535,843 B2 | 1/2017 | Zhuang et al. | |
| 2002/0087589 A1 | 7/2002 | Wallman | |
| 2011/0087713 A1 * | 4/2011 | Beard | G06F 12/0269 |
| | | | 707/816 |
| 2013/0339568 A1 * | 12/2013 | Corrie | G06F 9/45558 |
| | | | 711/6 |
| 2015/0227414 A1 | 8/2015 | Varma | |
| 2016/0098229 A1 * | 4/2016 | Schreiber | G06F 9/5022 |
| | | | 711/166 |

(Continued)

FOREIGN PATENT DOCUMENTS

WO    WO 00/00894    1/2000

OTHER PUBLICATIONS

Nick Parlante, Linked List Problems, 1998-2002, 35 pages, retrieved from Internet: http://cslibrary.stanford.edu/105/LinkedListProblems.pdf.

*Primary Examiner* — Brian R Peugh
(74) *Attorney, Agent, or Firm* — Schmeiser, Olsen & Watts, LLP; Michael O'Keefe (57) ABSTRACT

A method of maintaining correctness of pointers from a managed heap to off-heap memory includes storing in a cache a first heap object in a managed heap that holds at least one off-heap pointer pointing to a first off-heap data structure and creating a weak reference node linked to the first heap object such that the first heap object is not kept alive by the weak reference node during garbage collection. Further disclosed are systems for maintaining correctness of pointers from a managed heap to off-heap memory.

20 Claims, 7 Drawing Sheets

(56) References Cited

U.S. PATENT DOCUMENTS

2016/0154658 A1* 6/2016 Stoodley ............. G06F 9/44578
717/166
2020/0167140 A1* 5/2020 Bauer ................. G06F 12/0261

* cited by examiner

MAINTAINING CORRECTNESS OF POINTERS FROM A MANAGED HEAP TO OFF-HEAP MEMORY

TECHNICAL FIELD

The present invention relates to systems and methods for maintaining the correctness of pointers. More specifically, the invention relates to systems and methods for maintaining the correctness of pointers from a managed heap to off-heap memory.

BACKGROUND

When a class redefinition occurs at runtime, a memory address of native memory for the class and its methods may change. When using a Java programming language, objects will not reference native data structures such as a J9Class and J9Method. In some cases, it is possible to maintain bidirectional pointers between the native memory and the Java heap. However, Direct MethodHandles are an exception, as Direct MethodHandles need to store the memory address of the J9Method it represents. Further, there may be multiple Direct MethodHandles referencing the same method. This makes a bidirectional pointer a suboptimal solution, as the native structure would have to maintain the accuracy of a set of pointers to the on-heap data structures, which includes updating on every garbage collection. A complete heap scan for objects that are known to have off-heap pointers is thus generally required. Such a scan of the entire heap for these objects is slow and requires significant computational resources.

SUMMARY

An embodiment of the present invention elates to a method, and associated computer system and computer program product, for maintaining correctness of pointers from a managed heap to off-heap memory. One or more processors of a computer system store in a cache a first heap object in a managed heap that holds at least one off-heap pointer pointing to a first off-heap data structure, and create a weak reference node linked to the first heap object such that the first heap object not kept alive by the weak reference node during garbage collection.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
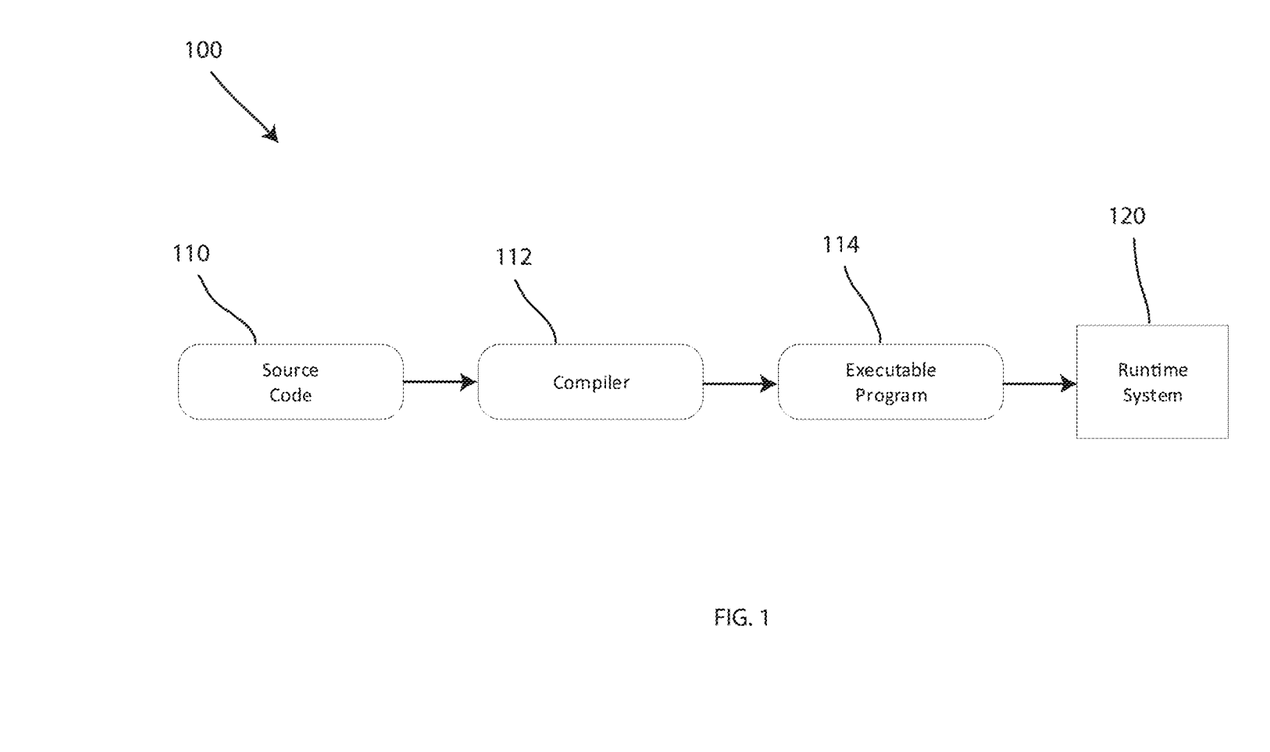
FIG. 1 depicts a block diagram of a system for maintaining correctness of pointers from a managed heap to off-heap memory, in accordance with embodiments of the present invention.

FIG. 1 depicts a block diagram of a system for maintaining correctness of pointers from a managed heap to off-heap memory 100, in accordance with embodiments of the present invention. The system 100 is shown including source code 110, a compiler 112, an executable program 114, and a runtime system 120. The code 110 may represent program code input into the compiler 112. The code 110 may be embodied by any type of program code, including program source code (e.g., object oriented source code, such as Java, high-level programming language code, such as C#), intermediate language code, etc. The compiler 112 evaluates the code 110 and generates compiled code that is used to create the executable program 114. The runtime system 120 may be configured to implement all or portions of the executable program 114. The runtime system 120 may be configured to implement control over the order in which work that was specified in terms of the language gets performed. In the case of the code 110 being Java, the runtime system 120 may be a Java virtual machine. The runtime system 120 may include garbage compiling capabilities.

Figure 2:
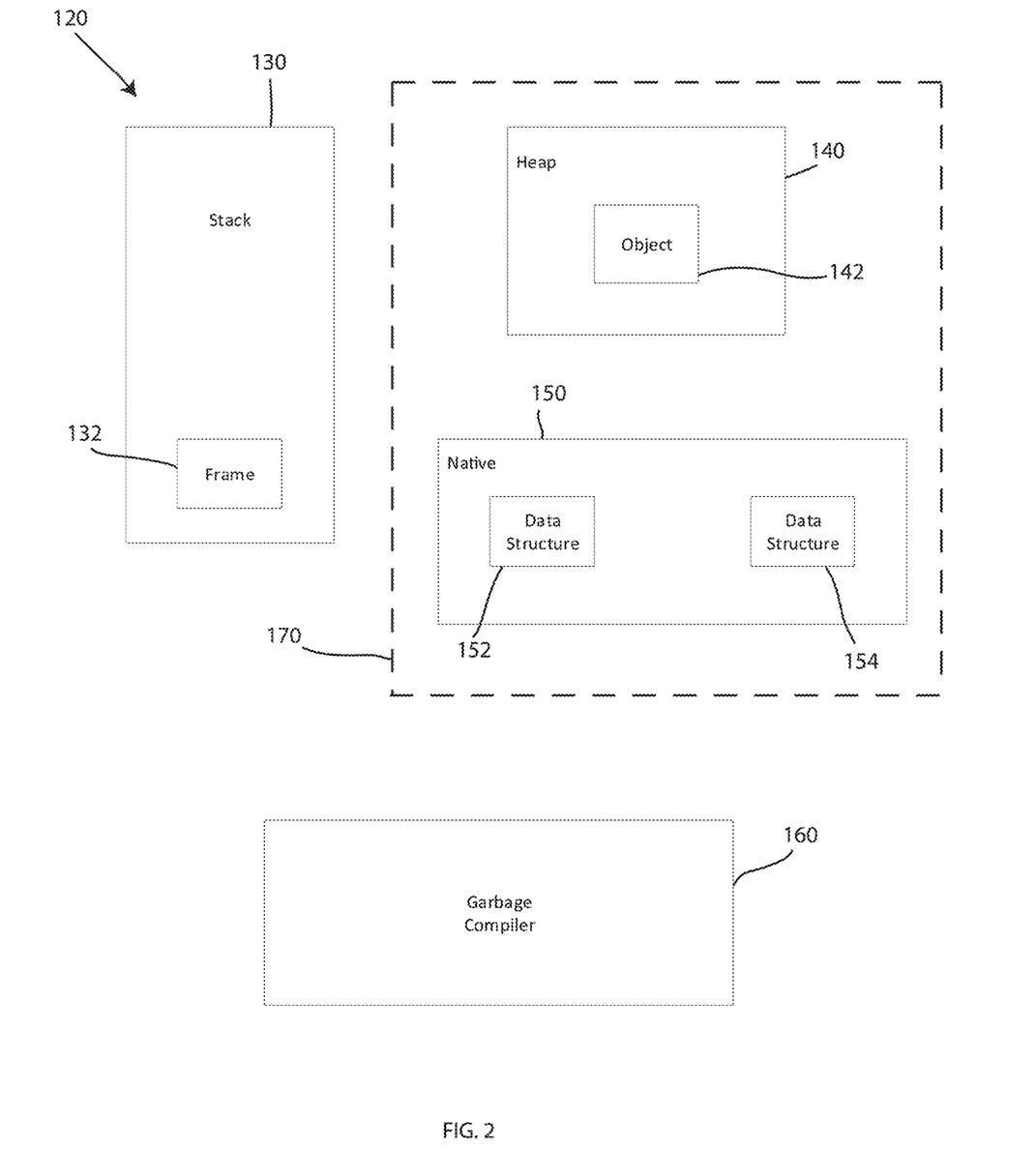
FIG. 2 depicts a block diagram of a runtime system of the system for maintaining correctness of pointers from a managed heap to off-heap memory of FIG. 1, in accordance with embodiments of the present invention.

FIG. 2 depicts a block diagram of a runtime system 120 of the system for maintaining correctness of pointers from a managed heap to off-heap memory 100 of FIG. 1, in accordance with embodiments of the present invention. The runtime system 120 may be an exemplary runtime system 120 in accordance with one embodiment. However, the runtime system 120 may be different from the embodiment shown.

The runtime system 120 is shown having a stack 130 with a frame 132 within the stack 130. The stack 130 may be a software stack that provides a basis to place the stack frame 132 on the stack. The stack frame 132 may be an object, method, frames and/or other data structures located on the stack 130. The stack may further provide a basis to remove the stack frame 132. The objects, data structures or frame 132 may further reference objects or data structures in other areas of the runtime system 120, such as a heap memory location 140. Thus, the frames 132 of the stack 130 may include pointers (not shown) to objects in the heap memory location 140.

The heap memory location 140 is further located in the runtime system 120, containing one or more objects 142. The stack frames 132 may contain references to the one or more objects 142. The one or more objects 142 may be many objects located in the heap memory location 140, some or all of which may be referenced by the frames 132 on the stack 130. The heap memory location 140 may be a location whereby memory is allocated during the runtime, rather than prior. The heap memory location 140 may be a global memory pool, dynamic memory allocation resource, or the like. The heap may be a managed heap, in one embodiment.

The runtime system 120 further includes a native memory location 150. The native memory location 150 is shown including a first data structure 152 and a second data structure 154. The native memory location 150 may be a memory location that provides memory tot the runtime system 120 by the operating system, for example. The native memory location 150 may be used for heap storage and other purposes. The one or more objects 142 stored in the heap memory location 140 may contain pointers or references to data structures in the native memory location 150, such as the first data structure 152 and the second data structure 154. Likewise, the data structures of the native memory locations 150 may point to or reference objects of the heap memory location 140 such as the one or more objects 142.

The runtime system 120 is shown further including a garbage collector 160. The garbage collector 160 may be an automatic memory management system. The garbage collector 160 may be configured to reclaim memory occupied by objects, data structures or the like that are no longer in use by the program. For example, if a structure being pointed to by a data object has been deleted off the stack 130, the data object is no longer in use by the program and the garbage collector 160 may remove this data object from the heap memory location, for example 140. Thus, the garbage collector 160 may be configured to reclaim this memory from the heap memory location 140, for example. The garbage collector 160 may not be configured to collect memory from the native memory location 150.

Figure 3:
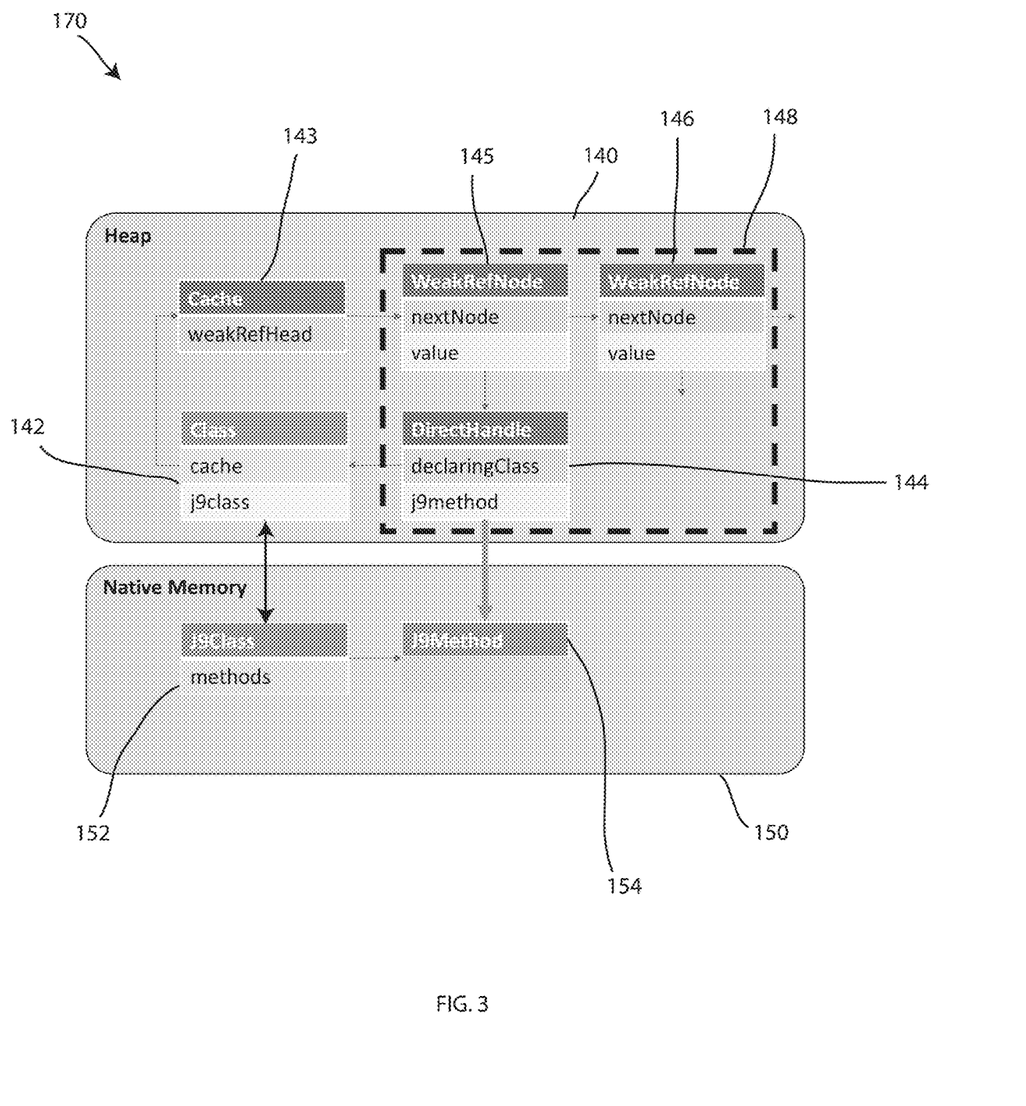
FIG. 3 depicts heap and native memory locations of the runtime system of FIG. 2, in accordance with embodiments of the present invention.

FIG. 3 depicts heap and native memory locations 170, 140 of the runtime system 120 of FIG. 2, in accordance with embodiments of the present invention. The runtime system 120 shown in FIG. 3 depicts a Java runtime system. However, the invention is not limited to this embodiment. The heap memory location 140 includes a first heap object 144 and a second heap object 142. In the embodiment shown, the first heap object 144 is a Direct MethodHandle data object. As shown, the second heap object 142 is a javalang.Class data object, that includes a cache. The native memory location 150 includes a first off-heap data structure 154 and a second off-heap data structure 152. The first off-heap data structure 154 may be a J9Method Java data structure, while the second off-heap data structure 152 may be a J9Class Java data structure.

The first off-heap data structure 154 and the second off-heap data structure 155 may be related data structures. As shown by way of exemplification, the second data structure 152 (the J9Class data structure) contains a pointer to the first data structure 154 (the J9Method data structure). Further, the Direct Method Handle first heap object 144 includes or otherwise maintains a pointer to the first off-heap data structure 154 (the J9Method data structure). Additionally, the second off-heap data structure 152 (the J9Class data structure) may maintain a pointer to the java.lang.Class second heap object 142. Similarly, the second heap object 142 (java.lang.Class) may maintain a pointer to the second off heap data structure 152 (the J9Class data structure). A bi-directional pointer may exist between the second heap object 142 (java.lang.Class) and the second off heap data structure 152 (the J9Class data structure).

In order to maintain the correctness of the pointer from the first heap object 144 to the first off-heap data structure 154 when a redefinition occurs that changes the memory address of the first off-heap data structure 154, the runtime system 120 may be configured to store the first heap object 144 that holds the unmanaged pointer to the first off-heap data structure 154 in a cache. In the embodiment shown, the cache where the first heap object 144 is stored may be in field of the second data object 142. The first heap object 144 may be placed in the cache at the time the first heap object 144 is constructed, at the time the second heap object 142 is constructed, or when the off-heap pointer of the first heap object 144 is written. The cache may only contain elements of a specific type in order to ensure that it is known which fields are off-heap pointers within the cache. To support multiple object types, multiple caches may be added.

The cache or caches created by the runtime system 120 in accordance with the above may create a live reference to the heap object. To allow the object to be properly collected by a garbage collector, the runtime system 120 may create a linked list of weak reference nodes 145, 146 in the heap memory location 140. The garbage collector 160 is configured to not treat the weak reference's object reference as live, thereby allowing proper age collection by the garbage collector 160. Thus, the garbage collector 160 may be configured to collect garbage within sub-section 148 of the heap memory location 140.

When an event occurs that will invalidate the off-heap pointer between the first heap object 144 and the first off-heap data structure 154, the runtime system 120 may be configured to perform one or more of several steps. First, the runtime system 120 may determine a new address of the first off-heap data structure. Thus, the runtime system 120 may understand the old and new address of the first off-heap data structure 154. The runtime system 120 may be configured to traverse the cache of objects that have pointers to off-heap data structures, such as the cache of the second heap object 142. The runtime system 120 may be configured to check whether any of the objects in the cache requires updating by comparing against the old off-heap memory address of the first off-heap data structure 154. The runtime system 120 may be configured to update the off-heap memory pointers as necessary, such as the off heap pointer from the first heap object 144 to the first off-heap data structure 154.

The runtime system 120 may further be configured to remove the weak reference node linked to the first heap object. The removing may be configured to occur during the creating of another weak reference node linked to a heap object such as the first heap object or another heap object stored in the cache or another cache. Alternatively or additionally, the removal of weak reference nodes linked to the first heap object may occur during the updating of the off-heap pointer held by the first heap object 144. The removal of the weak reference nodes created by the runtime system may occur at these times, but the removal may only occur for unneeded reference nodes. Still further, the garbage collector 160 may be configured to add the nodes for collected heap objects to a separate Collected List (not shown). During either of the above processes where removal is initiated, the nodes in the Collected List may be removed from the cache's linked list. The Collected List may be a subset of the cache's linked list.

Figure 4:
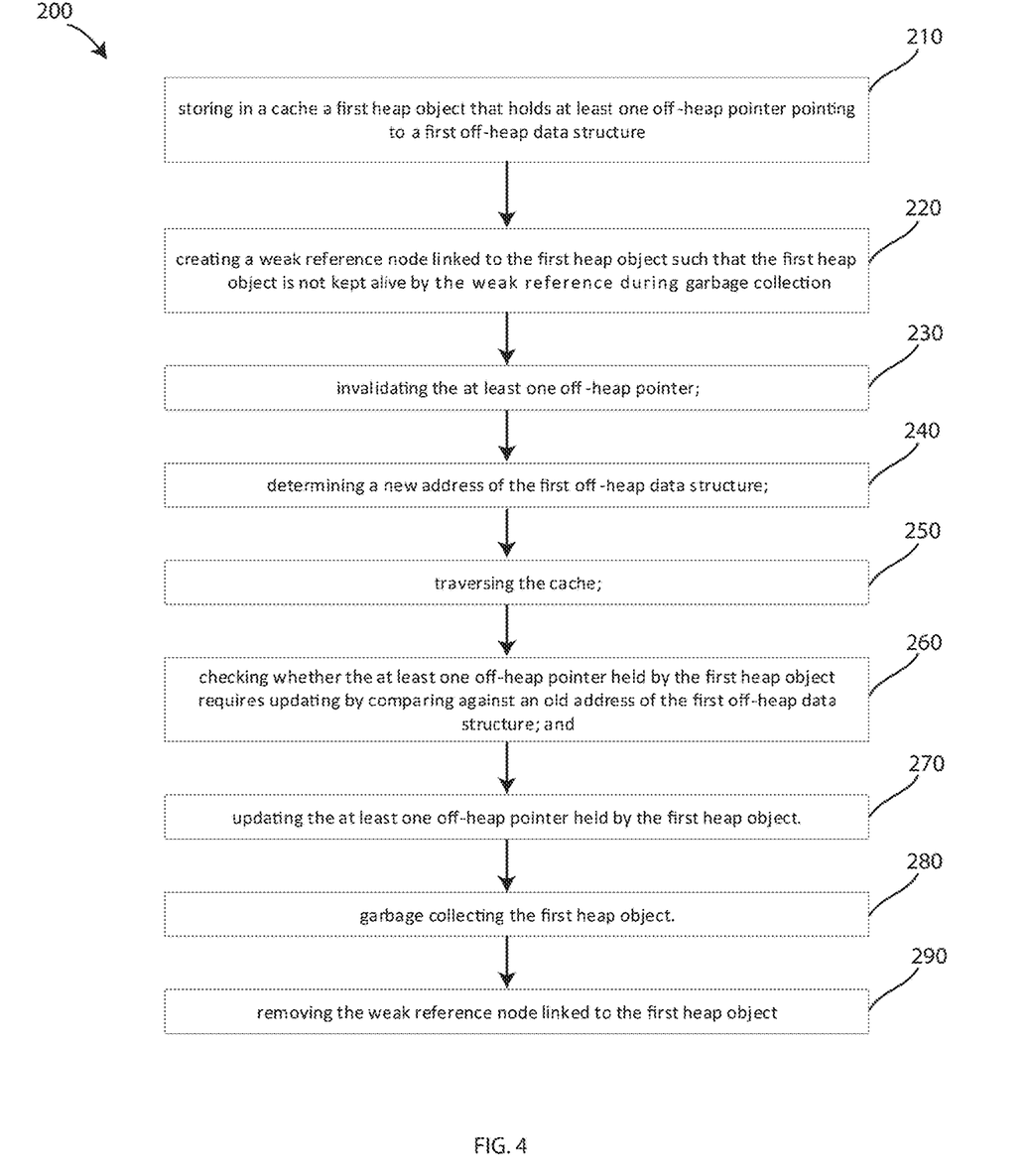
FIG. 4 depicts a flow chart of a method for maintaining correctness of pointers from a managed heap to off-heap memory, in accordance with embodiments of the present invention.

FIG. 4 depicts a flow chart of a method for maintaining correctness of pointers from a managed heap to off-heap memory 200, in accordance with embodiments of the present invention. The method 200 may include a step 210 of storing in a cache a first heap object that holds at least one off-heap pointer pointing to a first off-heap data structure. The method 200 includes a step 220 of creating a weak reference node linked to the first heap object such that the first heap object is not kept alive by this reference during garbage collection. The method 200 includes a step 230 of invalidating the at least one off-heap pointer. The method 200 includes a step 240 of determining a new address of the first off-heap data structure. The method 200 includes a step 250 of traversing the cache. The method 200 includes a step 260 of checking whether the at least one off-heap pointer held by the first heap object requires updating by comparing against an old address of the first off-heap data structure. The method 200 includes a step 270 of updating the at least one off-heap pointer held by the first heap object. The method 200 includes a step 280 of garbage collecting the first heap object. Still further, the method 200 includes a step 290 of removing the weak reference node linked to the first heap object.

Figure 5:
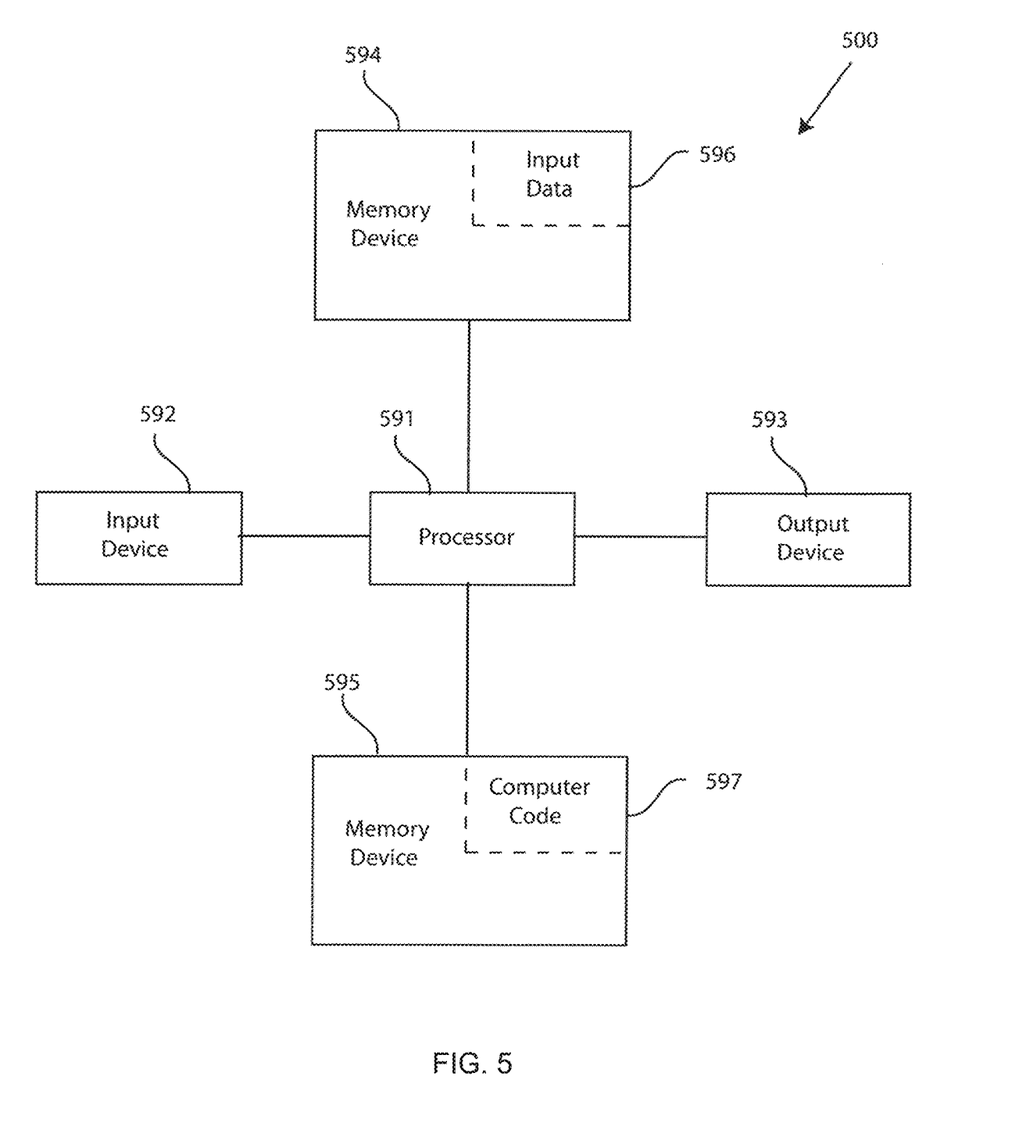
FIG. 5 depicts a block diagram of a computer system for the topic based collaborative recording and retrieving system of FIGS. 1-3, capable of implementing methods for executing digital actions in a retail environment of FIG. 4, in accordance with embodiments of the present invention.

FIG. 5 illustrates a block diagram of a computer system for maintaining correctness of pointers from a managed heap to off-heap memory of FIGS. 1-3, capable of implementing methods for maintaining correctness of pointers from a managed heap to off-heap memory of FIG. 4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for maintaining correctness of pointers from a managed heap to off-heap memory, in the manner prescribed by the embodiments of FIG. 4 using the system for maintaining correctness of pointers from a managed heap to off-heap memory of FIGS. 1-3, wherein the instructions of the computer code 597 may be executed by processor 591 via memory device 595. The computer code 597 may include software or program instructions that may implement one or more algorithms for implementing the methods for maintaining correctness of pointers from a managed heap to off-heap memory, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for maintaining correctness of pointers from a managed heap to off-heap memory. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for maintaining correctness of pointers from a managed heap to off-heap memory. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for maintaining correctness of pointers from a managed heap to off-heap memory. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for maintaining correctness of pointers from a managed heap to off-heap memory.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
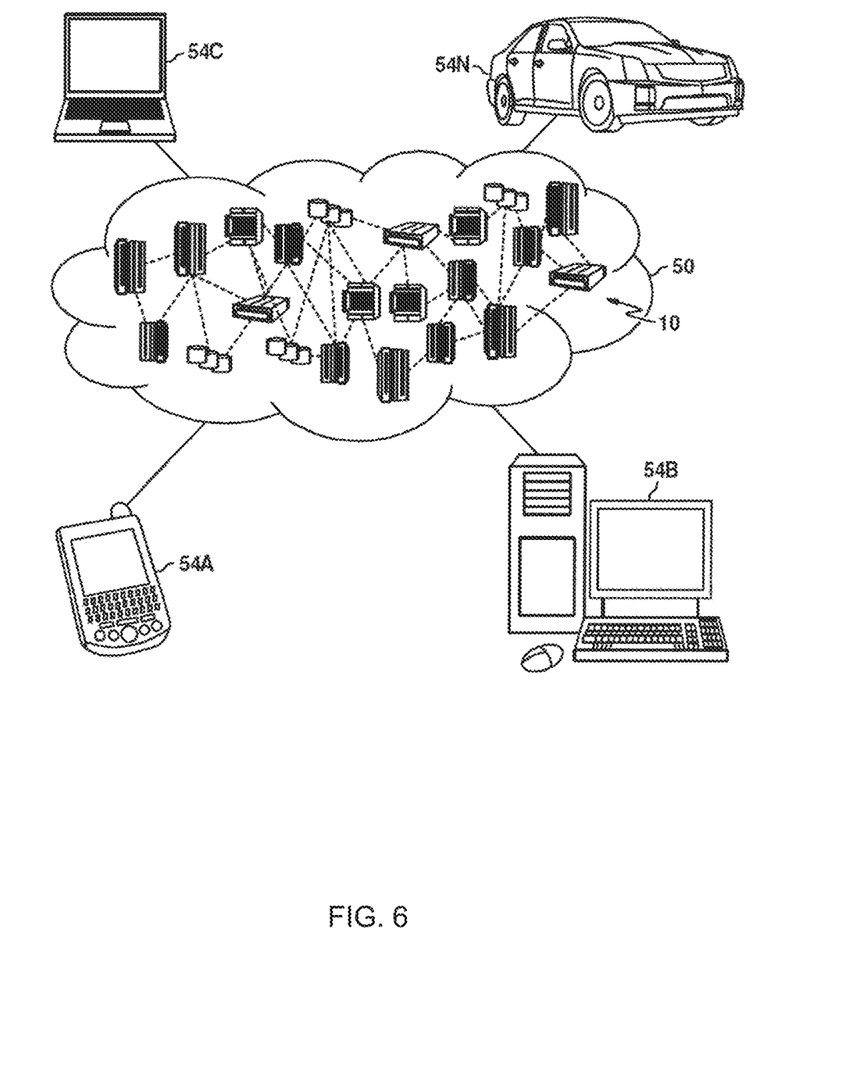
FIG. 6 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 7:
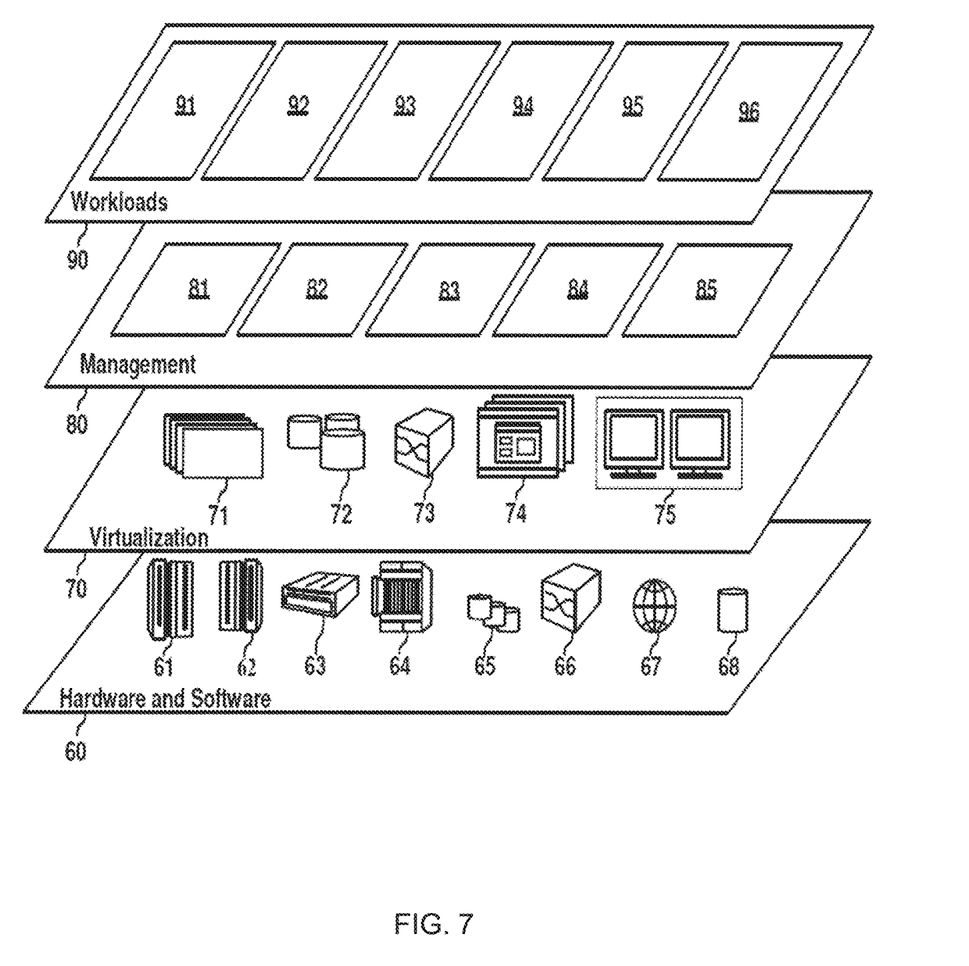
FIG. 7 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of maintaining correctness of pointers from a managed heap to off-heap memory 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of maintaining correctness of pointers from a managed, heap to off-heap memory, the method comprising:
    storing in a cache, by one or more processors of a computing system, a first heap object in a managed heap that holds at least one off-heap pointer pointing to a first off-heap data structure; and
    creating, by the one or more processors of the computing system, a weak reference node linked to the first heap object such that the first heap object is not kept alive by the weak reference node during garbage collection.

2. The method of claim 1, further comprising maintaining, by a second off-heap data structure related to the first off-heap data structure, a pointer to a second heap object, wherein the cache is in the second heap object.

3. The method of claim 1, further comprising:
    invalidating, by the one or more processors of the computing system, the at least one off-heap pointer;
    determining, by the one or more processors of the computing system, a new address of the first off-heap data structure;
    traversing, by the one or more processors of the computing system, the cache;
    checking, by the one or more processors of the computing system, whether the at least one off-heap pointer held by the first heap object requires updating by comparing against an old address of the first off-heap data structure; and
    updating, by the one or more processors of the computing system, the at least one off-heap pointer held by the first heap object.

4. The method of claim 1, further comprising removing, by the one or more processors of the computing system, the weak reference node linked to the first heap object, wherein the removing occurs during the creating, by the one or more processors of the computing system, of a second weak reference node linked to at least one of the first heap object or another heap object stored in the cache or another cache.

5. The method of claim 1, further comprising removing, by the one or more processors of the computing system, the weak reference node linked to the first heap object, wherein the removing occurs during the updating, by the one or more processors of the computing system.

6. The method of claim 1, wherein the storing occurs during at least one of:
    as part of construction of the first heap object; and
    at the time when the at least one off-heap pointer is written.

7. The method of claim 1, further comprising garbage collecting, by the one or more processors of the computing system, the first heap object.

8. A computer system, comprising:
    one or more processors;
    one or more memory devices coupled to the one or more processors; and
    one or more computer readable storage devices coupled to the one or more processors, wherein the one or more storage devices contain program code executable by the one or more processors via the one or more memory devices to implement a method of executing a digital action in a retail environment, the method comprising:

storing in a cache, by the one or more processors of the computing system, a first heap object in a managed heap that holds at least one off-heap pointer pointing to a first off-heap data structure; and creating, by the one or more processors of the computing system, a weak reference node linked to the first heap object such that the first heap object is not kept alive by the weak reference node during garbage collection.

9. The computer system of claim 8, the method further comprising:

maintaining, by a second off-heap data structure related to the first off-heap data structure, a pointer to a second heap object, wherein the cache is in the second heap object.

10. The computer system of claim 9, wherein the storing occurs during at least one of:

as part of construction of the first heap object; and at the time when the at least one off-heap pointer is written.

11. The computer system of claim 10, the method further comprising garbage collecting, by the one or more processors of the computing system, the first heap object.

12. The computer system of claim 8, the method further comprising:

invalidating, by the one or more processors of the computing system, the at least one off-heap pointer;

determining, by the one or more processors of the computing system, a new address of the first off-heap data structure;

traversing, by the one or more processors of the computing system, the cache;

checking, by the one or more processors of the computing system, whether the at least one off-heap pointer held by the first heap object requires updating by comparing against an old address of the first off-heap data structure; and updating, by the one or more processors of the computing system, the at least one off-heap pointer held by the first heap object.

13. The computer system of claim 12, the method further comprising removing, by the one or more processors of the computing system, the weak reference node linked to the first heap object, wherein the removing occurs during the creating, by the one or more processors of the computing system, of a second weak reference node linked to at least one of the first heap object or another heap object stored in the cache or another cache.

14. The computer system of claim 8, the method further comprising removing, by, the one or more processors of the computing system, the weak reference node linked to the first heap object, wherein the removing occurs during the updating, by the one or more processors of the computing system.

15. A computer program product, comprising a computer readable hardware storage device storing a computer readable program code, the computer readable program code comprising an algorithm that when executed by one or more processors of a computer system implements a method for of executing a digital action in a retail environment, the method comprising:

storing in a cache, by the one or more processors of the computing system, a first heap object in a managed heap that holds at least one off-heap pointer pointing to a first off-heap data structure; and creating, by the one or more processors of the computing system, a weak reference node linked to the first heap object such that the first heap object is not kept alive by the weak reference node during garbage collection.

16. The computer program product of claim 15, the method further comprising:

maintaining, by a second off-heap data structure related to the first off-heap data structure, a pointer to a second heap object, wherein the cache is in the second heap object.

17. The computer program product of claim 16, the method further comprising:

invalidating, by the one or more processors of the computing system, the at least one off-heap pointer;

determining, by the one or more processors of the computing system, a new address of the first off-heap data structure;

traversing, by the one or more processors of the computing system, the cache;

checking, by the one or more processors of the computing system, whether the at least one off-heap pointer held by the first heap object requires updating by comparing against an old address of the first off-heap data stricture; and updating, by the one or more processors of the computing system, the at least one off-heap pointer held by the first heap object.

18. The computer program product of claim 15, the method further comprising removing, by the one or more processors of the computing system, the weak reference node linked to the first heap object, wherein the removing occurs during the creating, by the one or more processors of the computing system, of a second weak reference node linked to at least one of the first heap object or another heap object stored, in the cache or another cache.

19. The computer program product of claim 15, the method further comprising removing, by the one or more processors of the computing system, the weak reference node linked to the first heap object, wherein the removing occurs during the updating, by the one or more processors of the computing system.

20. The computer program product of claim 19, wherein the storing occurs during at least one of:

as part of construction of the first heap object; and at the time when the at least one off-heap pointer is written.

* * * * *